(12) United States Patent
Yoo et al.

(10) Patent No.: US 11,984,595 B2
(45) Date of Patent: May 14, 2024

(54) LITHIUM SECONDARY BATTERY (71) Applicant: SK INNOVATION CO., LTD., Seoul (KR)

(72) Inventors: Kyung Bin Yoo, Daejeon (KR); Kook Hyun Han, Daejeon (KR); Duck Chul Hwang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 17/499,071

(22) Filed: Oct. 12, 2021

(65) Prior Publication Data
US 2022/0029163 A1  Jan. 27, 2022

Related U.S. Application Data (63) Continuation of application No. 16/250,732, filed on Jan. 17, 2019, now Pat. No. 11,211,605.

(30) Foreign Application Priority Data

Jan. 17, 2018 (KR) .................. 10-2018-0006188

(51) Int. Cl.
H01M 4/525 (2010.01)
H01M 4/02 (2006.01)
H01M 4/505 (2010.01)
H01M 10/0525 (2010.01)
H01M 10/0585 (2010.01)

(52) U.S. Cl.
CPC .......... *H01M 4/525* (2013.01); *H01M 4/505* (2013.01); *H01M 10/0525* (2013.01); *H01M 10/0585* (2013.01); *H01M 2004/021* (2013.01); *H01M 2004/028* (2013.01)

(58) Field of Classification Search
CPC ..................................................... H01M 4/525
See application file for complete search history.

(56) References Cited

U.S. PATENT DOCUMENTS

2015/0340686 A1* 11/2015 Sun ........................ H01M 4/366
429/223
2016/0149210 A1 5/2016 Yoo et al.
2018/0108940 A1* 4/2018 Kwon .................... C01G 53/50

FOREIGN PATENT DOCUMENTS

| CN | 105322220 A | 2/2016 |
| CN | 105322223 A | 2/2016 |
| CN | 106797028 A | 5/2017 |
| KR | 10-2006-0112823 A | 11/2006 |
| KR | 10-2007-0097923 A | 10/2007 |
| KR | 10-2014-0085347 A | 7/2014 |

(Continued)

OTHER PUBLICATIONS

Office Action for the Korean Patent Application No. 10-2018-0006188 issued by the Korean Intellectual Property Office dated Oct. 26, 2022.

(Continued)

*Primary Examiner* — Brian R Ohara
(74) *Attorney, Agent, or Firm* — IP & T GROUP LLP (57) ABSTRACT A lithium secondary battery includes a cathode formed from a cathode active material including a cathode active material particle having a specific concentration ratio, an anode; and a separation layer interposed between the cathode and the anode. The lithium secondary battery has improved formation discharge amount, formation discharge efficiency and power output.

6 Claims, 2 Drawing Sheets (56) References Cited

FOREIGN PATENT DOCUMENTS

| KR | 10-2016-0061077 A | 5/2016 |
| KR | 10-2016-0129764 A | 11/2016 |
| KR | 10-2017-0102293 A | 9/2017 |
| WO | 2013/145913 A1 | 10/2013 |

OTHER PUBLICATIONS

Office Action for the Chinese Patent Application No. 201910043644.1 issued by the Chinese Patent Office dated May 23, 2023.
Notice of Allowance for Korean Patent Application No. 10-2018-0006188 issued by the Korean Patent Office dated Jun. 16, 2023.

* cited by examiner

LITHIUM SECONDARY BATTERY

CROSS-REFERENCE TO RELATED APPLICATION AND CLAIM OF PRIORITY

The present application is a Continuation of U.S. patent application Ser. No. 16/250,732 filed on Jan. 17, 2019, which claims priority to Korean Patent Application No. 10-2018-0006188 filed on Jan. 17, 2018 in the Korean Intellectual Property Office (KIPO), the entire disclosure of which is incorporated by reference herein.

BACKGROUND

1. Field

The present invention relates to a lithium secondary battery. More particularly, the present invention relates to a lithium secondary battery including a lithium metal oxide.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as a hybrid automobile.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer, and an electrolyte immersing the electrode assembly. The lithium secondary battery may further include an outer case having, e.g., a pouch shape.

A lithium metal oxide may be used as a cathode active material of the lithium secondary battery preferably having high capacity, power and life-span. Further, a stability of the lithium secondary battery or the cathode active material under a harsh condition at a high temperature or a low temperature is also required as art industrial application of the lithium secondary battery is expanded. Additionally, when the lithium secondary battery or the cathode active material is penetrated by an external object, a resistance with respect to failures such as a short-circuit, an ignition or art explosion may be also needed.

However, the cathode active material having all of the above-mentioned properties May not be easily achieved. For example, Korean Publication of Patent Application No. 10-2017-0093085 discloses a cathode active material including a transition metal compound and an ion adsorbing binder, which may not provide sufficient life-span and stability.

SUMMARY

According to an aspect of the present invention, there is provided a lithium secondary battery having improved electrical and mechanical reliability and stability.

According to example embodiments, a lithium secondary battery includes a cathode formed from a cathode active material including a cathode active material particle represented by Chemical Formula 1, an anode, and a separation layer interposed between the cathode and the anode.

$$Li_xM1_aM2_bM3_cO_y \quad \text{[Chemical Formula 1]}$$

In Chemical Formula, M1, M2 and M3 represents a first metal, a second metal and a third metal, respectively, and are selected from a group consisting of Ni, Co, Mn, Na, Mg, Ca, Ti, V, Cr, Cu, Zn, Ge, Sr, Ag, Ba, Zr, Nb, Mo, Al, Ga and B.

In Chemical Formula 1, $0<x\leq1.1$, $2\leq y\leq2.02$, $0.8\leq a\leq0.9$, $0.01\leq b\leq0.2$, $0.04\leq c\leq0.2$, $0.075\leq c/(a+c)\leq0.115$, and $a+b+c=1$.

In some embodiments, in Chemical Formula 1, $0.090\leq c/(a+c)\leq0.111$.

In some embodiments, at least one of the first metal, the second metal and the third metal may include a concentration gradient region between a central portion of the cathode active material particle and a surface of the cathode active material particle.

In some embodiments, the first metal may include a decreasing concentration gradient region between a central portion of the cathode active material particle and a surface of the cathode active material particle. The second metal may include an increasing concentration gradient region between the central portion of the cathode active material particle and the surface of the cathode active material particle.

In some embodiments, the third metal may have a constant concentration from the central portion of the cathode active material particle to the surface of the cathode active material particle.

In some embodiments, the first metal may be Ni, the second metal may be Mn, and the third metal may be Co.

In some embodiments, an average diameter ($D_{50}$) of the cathode active material particle may be in a range from 3 μm to 2.5 μm.

According to example embodiments as described above, a cathode active material particle of a lithium secondary battery may have a concentration ratio within a specific range. The lithium secondary battery may have high formation discharge amount or efficiency and improved power output through the cathode active material.

In some embodiments, the cathode active material particle may have a concentration gradient so that capacity and power output of the lithium secondary battery may be further improved.

DETAILED DESCRIPTION OF THE EMBODIMENTS

According to example embodiments of the present invention, a lithium secondary battery including a cathode active material particle that may have a concentration ratio within a specific range and having improved formation discharge amount, formation discharge efficiency and power output is provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "a first" and "a second" used herein are not intended to specify the number or the order of objects, and only used to identify different elements or objects.

Figure 1:
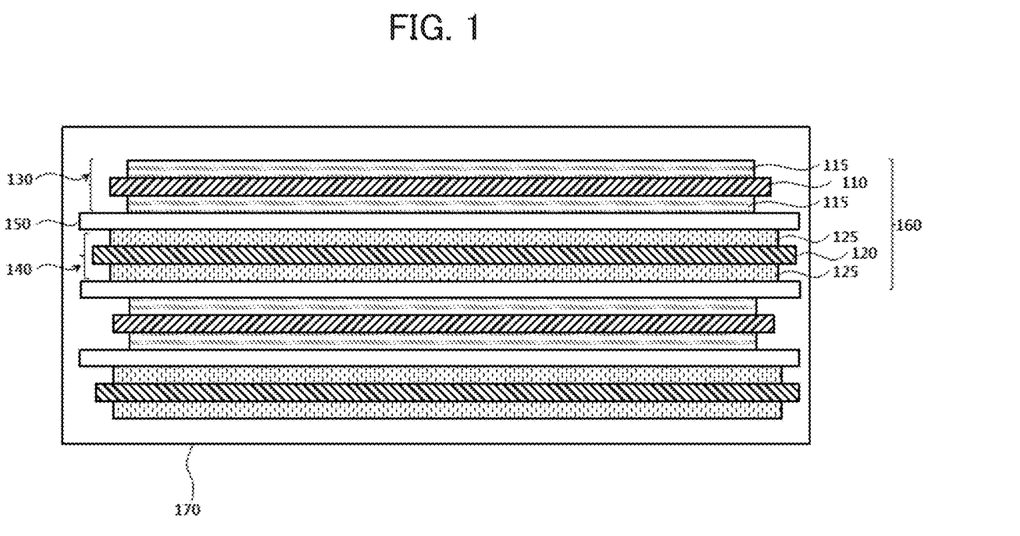
FIG. 1 is a schematic cross-sectional view illustrating a lithium secondary battery in accordance with example embodiments.

FIG. 1 is a schematic cross-sectional view illustrating a lithium secondary battery in accordance with example embodiments.

Referring to FIG. 1, a lithium secondary battery may include a cathode 130, and anode 140 and a separation layer 150 interposed between the cathode 130 and the anode 140.

The cathode 130 may include a cathode current collector 110 and a cathode active material layer 115 formed by coating a cathode active material on the cathode current collector 110. In example embodiments, the cathode active material may include a cathode active material particle represented by Chemical Formula 1 below.

[Chemical Formula 1]

In the Chemical Formula 1 above, M1, M2 and M3 may represent a first metal, a second metal and a third metal, respectively, and may be selected from Ni, Co, Mn, Na, Mg, Ca, Ti, V, Cr, Cu, Zn, Ge, Sr, Ag, Ba, Zr, Nb, Mo, Al, Ga and B. Here, $0<x\leq1.1$, $2\leq y\leq2.02$, $0.8\leq a\leq0.9$, $0.01\leq b\leq0.2$, $0.04\leq c\leq0.2$, $0.075\leq c/(a+)\leq0.115$, and $a+b+c=1$.

In the lithium secondary battery according to exemplary embodiments, elements in Chemical Formula 1 may be included by a concentration ratio as described above so that high formation discharge amount and efficiency may be achieved and power output of the battery may be also improved.

The term "concentration" used herein may indicate, e.g., molar ratios of the first to third metals.

In some embodiments, M1, M2 and M3 of Chemical Formula 1 may be nickel (Ni), manganese (Mn) and cobalt (Co), respectively.

The first metal M1 may serve as a metal related to a capacity of the lithium secondary battery, and may be Ni.

For example, as an amount of nickel becomes higher, capacity and power output of the lithium secondary battery may be improved. However, an excessive amount of nickel may degrade life-span of the battery, and may be disadvantageous in an aspect of mechanical and electrical stability of the battery. For example, when the amount of nickel is excessively increased, defects such as ignition or short-circuit by a penetration of an external object may not be sufficiently suppressed. In some embodiments, the concentration of the first metal (e.g., Ni) may be represented by "$0.8\leq a\leq0.9$" in Chemical Formula 1, preferably $0.8\leq a=\leq0.88$, so that mechanical and electrical stability of the battery may be achieved while improving capacity and power output of the battery.

For example, the second metal M2 may serve as a metal related to the mechanical and electrical stability of the lithium secondary battery, and may be manganese (Mn). Defects such as ignition or short-circuit due to the penetration through a surface of the cathode active material particle may be suppressed or reduced, and a life-span of the lithium secondary battery may be also enhanced.

In some embodiments, the concentration of the second metal M2 (e.g., Mn) may be represented by "$0.01\leq b\leq0.2$" in Chemical Formula 1, preferably $0.01\leq b\leq0.16$, so that the defects such as ignition or short-circuit due to the penetration through the surface of the cathode active material particle may be effectively prevented, and mechanical stability may be enhanced.

For example, the third metal M3 may serve as a metal related to a conductivity or a resistance of the lithium secondary battery, and may be cobalt (Co).

In some embodiments, the concentration of the third metal M3 (e.g., Co) may be represented by "$0.04\leq c\leq0.2$" in Chemical Formula 1, preferably $0.04\leq a\leq0.16$, so that a current or a charge flow through the cathode active material may be uniformly maintained while improving the conductivity of the battery and maintaining low resistance.

In some embodiments, c/(a+c) may be defined as a ratio of a molar concentration of the third metal relative to a sum of molar concentrations of the first metal and the third metal. In Chemical Formula 1, c/(a+c) may be in a range from 0.075 to 0.115. Within this range, a discharge amount and a discharge efficiency at an initial formation process of the lithium secondary battery may be improved and art excellent power output may be also obtained. For example, if the first metal is Ni and the third metal is Co, the concentration of Co may be controlled within the above range so that an energy band gap of the cathode active material may become small, and lithium ion diffusion and electron migration in the cathode active material may be facilitated. Thus, the power output and the initial formation discharge efficiency may be enhanced.

If c/(a+c) in Chemical Formula 1 is less than about 0.075, an amount of, e.g., Ni is excessively increased to degrade mechanical and electrical stability, and to cause a reduction of the discharge efficiency and the power output. If c/(a+c) exceeds about 0.115, the conductivity may be reduced to also cause the reduction of the power output and mechanical stability.

In some embodiments, c/(a+c) in Chemical Formula 1 may be controlled from 0.09 to 0.111 so that the mechanical stability may be further enhanced while achieving the improved power output and initial formation discharge efficiency.

In some embodiments, the cathode active material particle may include a lithium metal oxide having a continuous concentration gradient from a central portion to a surface. For example, the first metal, the second metal and/or the third metal may have a concentration gradient region between the central portion and the surface of the cathode active material particle. In some embodiments, the cathode active material particle may include the concentration gradient region in at least a portion between the central portion and a surface portion. In this case, values of a, b, c and c/(a+c) in Chemical Formula 1 are based on a total composition of the cathode active material particle.

The term "central portion" used herein may include a central point of the active material particle and may also include a region within a predetermined radius from the central point. For example, the central portion may encompass a region within a radius of about 0.1 μm from the central point of the active material particle.

The term "surface" used herein may include an outermost surface of the active material particle, and may also include a predetermined thickness from the outermost surface. For example, "surface, portion" may include a region within a thickness of about 0.1 μm from the outermost surface of the active material particle.

In some embodiments, the continuous concentration region may include a linear concentration profile or a curved concentration profile. In the curved concentration profile, the concentration may change in a uniform trend without any inflection point.

In an embodiment, at least one metal except for lithium included in the cathode active material particle may have a decreasing concentration gradient region between the central portion and the surface of the cathode active material particle, and at least one metal except for lithium included in the cathode active material particle may have an increasing concentration gradient region between the central portion and the surface of the cathode active material particle.

In an embodiment, at least one metal except for lithium included in the cathode active material particle may have a substantially constant concentration from the central portion to the surface.

In an embodiment, the metals except for lithium included in the cathode active material particle may include the first metal M1 and the second metal M2. The first metal M1 may have the decreasing concentration gradient region between the central portion and the surface of the cathode active material particle. The second metal M2 may have the increasing concentration gradient region between the central portion and the surface of the cathode active material particle.

In an embodiment, the metals except for lithium included in the cathode active material particle may further include the third metal M3. The third metal M3 may have the substantially constant concentration from the central portion to the surface.

In some embodiments, M1, M2 and M3 of Chemical Formula 1 may be nickel (Ni), manganese (Mn) and cobalt. (Co), respectively.

For example, Ni may serve as a metal for providing a capacity of the lithium secondary battery, and may be used as the first metal M1. The concentration of Ni may have the decreasing concentration gradient region in at least a portion between the central portion and the surface portion. For example, an amount of Ni may be relativelylarge at a portion in the decreasing concentration gradient region adjacent to the central portion, so that the initial formation discharge amount/efficiency and the power output of the lithium secondary battery may be obtained. An amount of Ni may be relatively small at a portion in the decreasing concentration gradient region adjacent to the surface portion so that mechanical stability of the lithium secondary battery may be further enhanced.

In some embodiments, in Chemical Formula 1, the first metal M1 is Ni, $0.8 \leq a \leq 0.9$, and the concentration (or the molar ratio) of Ni may have the decreasing concentration gradient region in at least a portion between the central portion and the surface portion. Preferably, in Chemical Formula 1, the first metal M1 is Ni, $0.8 \leq a \leq 0.88$, and the concentration (or the molar ratio) of Ni may have the decreasing concentration gradient region in at least a portion between the central portion and the surface portion.

For example, Mn may be used as the second metal M2, and the concentration of Mn may have the increasing concentration gradient region in at least a portion between the central portion and the surface portion. For example, an amount of Mn may be relatively large at a portion in the increasing concentration gradient region adjacent to the surface portion. Thus, defects such as ignition or short-circuit due to the penetration through the surface of the cathode active material particle may be effectively prevented, and mechanical and electrical stability may be further enhanced.

In some embodiments, in Chemical Formula 1, the second metal M2 is Mn, $0.01 \leq b \leq 0.2$, and the concentration (or the molar ratio) of Mn may have, the ncreasing concentration gradient region in at least a portion between the central portion and the surface portion. Preferably, in Chemical Formula 1, the second metal M2 is Mn, $0.01 \leq a \leq 0.16$, and the concentration (or the molarratio) of Mn may have the increasing concentration gradient region in at least a portion between the central portion and the surface portion.

For example, Co rrray be used as the third meal M3, and the concentration of Co may be substantially fixed or constantly maintained throughout an entire region of the cathode active material particle. Accordingly, the current or the charge flow through the cathode active material may be uniformly maintained while improving the conductivity of the battery and maintaining low resistance. In some embodiments, in Chemical Formula 1, the third metal M3 is Co, $0.04 \leq c \leq 0.2$, and the concentration of the third metal may be substantially constant from the central portion to the surface of the cathode active material particle.

In a formation of the cathode active material particle, metal precursor solutions having different concentrations may be prepared. The metal precursor solutions may include precursors of metals that may be included in the cathode active material. For example, the metal precursors may include halides, hydroxides, acid salts, etc of the metals.

For example, the metal precursors may include a lithium precursor (e.g., a lithium oxide), a nickel precursor, a rrranganese precursor and a cobalt precursor.

In some embodiments, a first precursor solution having a target composition at the central portion (e.g., concentrations of nickel, manganese and cobalt at the central portion) and a second precursor solution having a target composition at the surface or the surface portion (e.g., concentrations of nickel, manganese and cobalt at the surface) may be each prepared.

Subsequently, the first and second precursor solution may be mixed and a precipitate may be formed by a co-precipitation method. In some embodiments, a mixing ratio may be continuously changed so that a continuous concentration gradient may be formed from the target composition at the central portion to the target composition at the surface. In some embodiments, the mixing ratio may be changed at a specific period so that a concentration gradient layer may be formed between the central portion and the surface portion. Accordingly, the precipitate may include a concentration gradient of the metals therein.

In some embodiments, a chelate agent and a basic agent (e.g., an alkaline agent) may be added while forming the precipitate. In some embodiments, the precipitate may be thermally treated, and then a lithium salt may be mixed and thermally treated again.

In some embodiments, the cathode active material particle may include a coating layer formed on a surface thereof. For example, the coating layer may include Al, Ti, Ba, Zr, Si, B, Mg, P, an alloy thereof or an oxide thereof. These may be used alone or in a combination thereof. The cathode active material particle may be protected by the coating layer so that mechanical stability and life-span may be further enhanced.

In an embodiment, elements, the alloy or the oxide of the coating layer may be inserted into the cathode active material particle as dopants.

In some embodiments, the cathode ac material particle may be formed from a primary particle having a rod-type shape. An average diameter of the cathode active material particle may be in a range from about 3 μm to about 25 μm.

In exemplar embodiments, the cathode active material particle may be mixed and stirred together with a binder, a conductive additive and/or a dispersive additive in a solvent to form a slurry. The slurry ay be coated on the cathode current collector 110, and pressed and dried to obtain the cathode 130.

The cathode current collector 110 may include stainless-steel, nickel, aluminum, titanium, copper or an alloy thereof. Preferably, aluminum or an alloy thereof may be used.

The binder may include an organic based binder such as a poly vinylidene fluoride-hexafluoropropylene copolymer (PVDF-co-HFP), poly vinylidenefluoride (PVDP), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 115, and an amount of the cathode active mated al particles may be relatively increased. Thus, capacity and power output of the lithium secondary battery may be further improved.

The conductive additive may be added to facilitate an electron mobility between the active material particles. For example, the conductive additive may include a carbon-based material such as graphite, carbon black, g aphene, carbon nanotube, etc., and/or a metal-based material such as tin, tin oxide, titanium, oxide, a perovskite material such as $LaSrCoO_3$ or $LaSrMnO_3$.

In exemplary embodiments, the anode 140 may include an anode current collector 120 and an anode active material layer 125 formed by coating an anode active material on the anode current collector 120.

The anode active material may include a material that may be capable of adsorbing and ejecting lithium ions. For example, a carbon-based material such as a crystalline carbon, an amorphous carbon, a carbon complex or a carbon fiber, a lithium alloy, silicon, tin, etc., may be used. The amorphous carbon may include a hard carbon, cokes, a mesocarbon microbead (MCMB) calcinated at a temperature of 1,500° C. or less, a mesophase pitch-based carbon fiber (MPCF), ETC. The crystalline carbon may include a graphite-based material, such as natural graphite, graphitized cokes, graphitized MCMB, graphitized INIPCF, etc. The lithium alloy may further include aluminum, zinc, bismuth, cadmium, antimony, silicon, lead, tin, gallium, or indium.

The anode current collector 120 may include gold, stainless-steel, nickel, aluminum, titanium, copper or an alloy thereof, preferably, may include copper or a copper alloy.

In some embodiments, the anode active material may be mixed and stirred together with a binder, a conductive additive and/or a dispersive additive in a solvent to form a slurry. The slurry may be coated on the anode current collector 120, and pressed and dried to obtain the anode 140.

The binder and the conductive additive substantially the same as or similar to those as mentioned above may be used. In some embodiments, the binder for the anode 140 may include an aqueous hinder such as such as styrene-butadiene rubber (SBR) that ay be used with a thickener such as carboxymethyl cellulose (CMC) so that compatibility with the carbon-based active material may be improved.

The separation layer 150 may be interposed between the cathode 130 and the anode 140. The separation layer 150 may include a porous polymer film prepared from, e.g., a polyolefin-based polymer such as an ethylene homopolymer, a propylene homopolymer, an ethylene/butene copolyrrer, an ethylene/hexene copolymer, an ethylene/methacrylate copolymer, or the like. The separation layer 150 may be also formed from a non-woven fabric including a glass fiber with a high melting point, a polyethylene terephthalate fiber, or the like.

In some embodiments, an area and/or a volume of the anode 140 (e.g., a contact area with the separation layer 150) may be greater than that of the cathode 130. Thus, lithium ions generated from the cathode 130 may be easily transferred to the anode 140 without loss by, e.g., precipitation or sedimentation. Therefore, the enhancement of power and stability by the combination of the first and second cathode active material particles may be effectively implemented.

In example embodiments, an electrode cell 160 may be defined by the cathode 130, the anode 140 and the separator 150, and a plurality of the electrode cells 160 may be stacked to form an electrode assembly having, e.g., a jelly roll shape. For example, the electrode assembly may be formed by winding, laminating or folding of the separation layer 150.

The electrode assembly may be accommodated in an outer case 170 together with an electrolyte to form the lithium secondary battery. In example embodiments, the electrolyte may include a non-aqueous electrolyte solution.

The non-aqueous electrolyte solution may include a lithium salt and an organic solvent. The lithium salt may be represented by $Li+X^-$, and an anion of the lithium salt $X^-$ may include, e.g., $F^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone: or in a combination thereof.

An electrode tab may be formed from each of the cathode current collector 110 and the anode current collector 120 to extend to one end of the outer case 170. The electrode tabs may be welded together with the one end of the outer case 170 to form an electrode lead exposed at an outside of the outer case 170.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLES AND COMPARATIVE EXAMPLES

Example 1

Fabrication of Secondary Battery (1) Cathode

A cathode active material particle represented by $LiNi_aMn_bCo_cO_7$ (a=0.8, b=0.1, c=0.1) was prepared by a co-precipitation method known in the related art. Denka Black was used as a conductive additive, and PVDF was used as a binder. The cathode active material particle, Denka Black as a conductive additive and PVDF as a binder were mixed by a weight ratio of 92:5:3 to form a positive electrode slurry. The positive electrode slurry was coated, dried, and pressed on an aluminum substrate to form a cathode. A density of the cathode after the pressing was controlled in a range from about 2.4 glee to about 3.4 g/cc.

(2) Anode

An anode slurry was prepared by mixing 93 wt % of a natural graphite as an anode active material, 5 wt % of a flake type conductive additive KS6, 1 wt % of SBR as a binder, and 1 wt % of CMC as a thickener. The anode slurry was coated, dried, and pressed on a copper substrate to form an anode.

(3) Fabrication of coin half cell

The cathode and the anode obtained as described above were notched by a proper size and stacked, and a separator (polyethylene, thickness: 25 μm) was interposed between the cathode and the anode to form a coin half cell.

(4) Fabrication of lithium secondary battery

The cathode and the anode obtained as described above were notched with a proper size and stacked, and a separator (polyethylene, thickness: 25 μm) was interposed between the cathode and the anode to form an electrode cell. Each tab portion of the cathode and the anode was welded. The welded cathode/separator/anode assembly was inserted in a pouch, and three sides of the pouch (e.g., except for an electrolyte injection side) were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by dissolving 1M $LiPF_6$ in a mixed solvent of EC/EMC/DEC (25/45/30; volume ratio), and then 1 wt % of vinylene carbonate, 0.5 wt % of 1,3-propensultone (PRS), and 0.5 wt % of lithium his (oxalato) borate (LiBOB) were added.

The lithium secondary battery as fabricated above was pre-charged by applying a pre-charging current (2.5 A) corresponding to 0.25 C for 36 minutes. After 1 hour, the battery was degased, aged for more than 24 hours, and then a formation charging-discharging (charging condition of CC-CV 0.2 C 4.2 V 0.05 C CUT-OFF, discharging condition CC 0.2 C 2.5 V CUT-OFF) was performed. Then, a standard charging-discharging (charging condition of CC-CV 0.5 C 4.2 V 0.05 C CUT-OFF, discharging condition CC 0.5 C 2.5 V CUT-OFF) was performed.

Examples 2 to 9 and Comparative Examples 1 to 16

Fabrication of Secondary Battery

Lithium secondary batteries were fabricated by processes the same as those of Example 1 except that a, b and c in a total composition of the cathode active material represent by $LiNi_aMn_bCo_cO_2$ were anged as shown in Table 1 below.

TABLE 1

| | a | b | c | c/(a + c) |
|---|---|---|---|---|
| Example 1 | 0.8 | 0.1 | 0.1 | 0.111 |
| Example 2 | 0.8 | 0.12 | 0.08 | 0.091 |
| Example 3 | 0.8 | 0.133 | 0.067 | 0.077 |
| Example 4 | 0.84 | 0.055 | 0.105 | 0.111 |
| Example 5 | 0.84 | 0.076 | 0.084 | 0.091 |
| Example 6 | 0.84 | 0.09 | 0.070 | 0.077 |
| Example 7 | 0.88 | 0.01 | 0.11 | 0.111 |
| Example 8 | 0.88 | 0.032 | 0.088 | 0.091 |
| Example 9 | 0.88 | 0.047 | 0.073 | 0.077 |
| Comparative Example 1 | 0.8 | 0.067 | 0.133 | 0.143 |
| Comparative Example 2 | 0.8 | 0.086 | 0.114 | 0.125 |
| Comparative Example 3 | 0.8 | 0.138 | 0.062 | 0.071 |
| Comparative Example 4 | 0.8 | 0.147 | 0.053 | 0.063 |
| Comparative Example 5 | 0.8 | 0.153 | 0.047 | 0.056 |
| Comparative Example 6 | 0.8 | 0.158 | 0.042 | 0.05 |
| Comparative Example 7 | 0.84 | 0.02 | 0.14 | 0.143 |
| Comparative Example 8 | 0.84 | 0.04 | 0.12 | 0.125 |
| Comparative Example 9 | 0.84 | 0.095 | 0.065 | 0.071 |
| Comparative Example 10 | 0.84 | 0.104 | 0.056 | 0.063 |
| Comparative Example 11 | 0.84 | 0.111 | 0.049 | 0.056 |
| Comparative Example 12 | 0.84 | 0.116 | 0.044 | 0.05 |
| Comparative Example 13 | 0.88 | 0.052 | 0.068 | 0.071 |
| Comparative Example 14 | 0.88 | 0.061 | 0.059 | 0.063 |
| Comparative Example 15 | 0.88 | 0.068 | 0.052 | 0.056 |
| Comparative Example 16 | 0.88 | 0.074 | 0.046 | 0.05 |

Example 10

Example Fabrication of Secondary Battery

Figure 2:
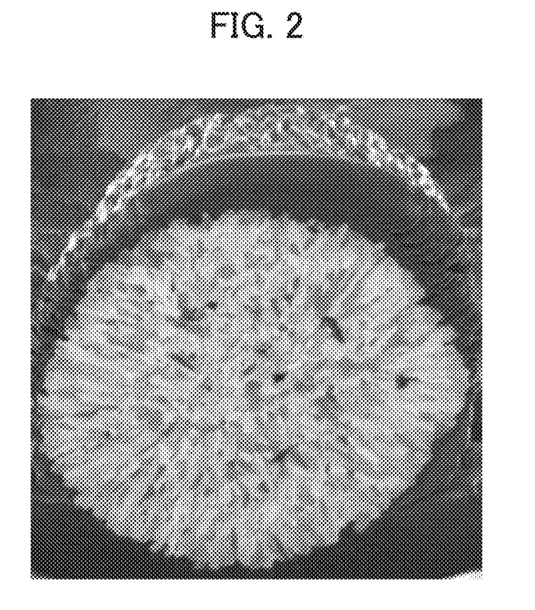
FIG. 2 is a cross-sectional image of a cathode active material particle prepared in accordance with some example embodiments.

A precursor mixing ratio was continuously changed to form precipitates so that a cathode active material particle including a concentration gradient region between a central portion and a surface portion and having a total composition was $LiNi_{0.80}Mn_{0.10}Co_{0.10}O_2$ (a=0.80, b=0.10, c=0.10) was formed (see FIG. 2)

Further, a secondarybattery was formed using an anode, a separator, etc., the same as those in Example 1.

Figure 3:
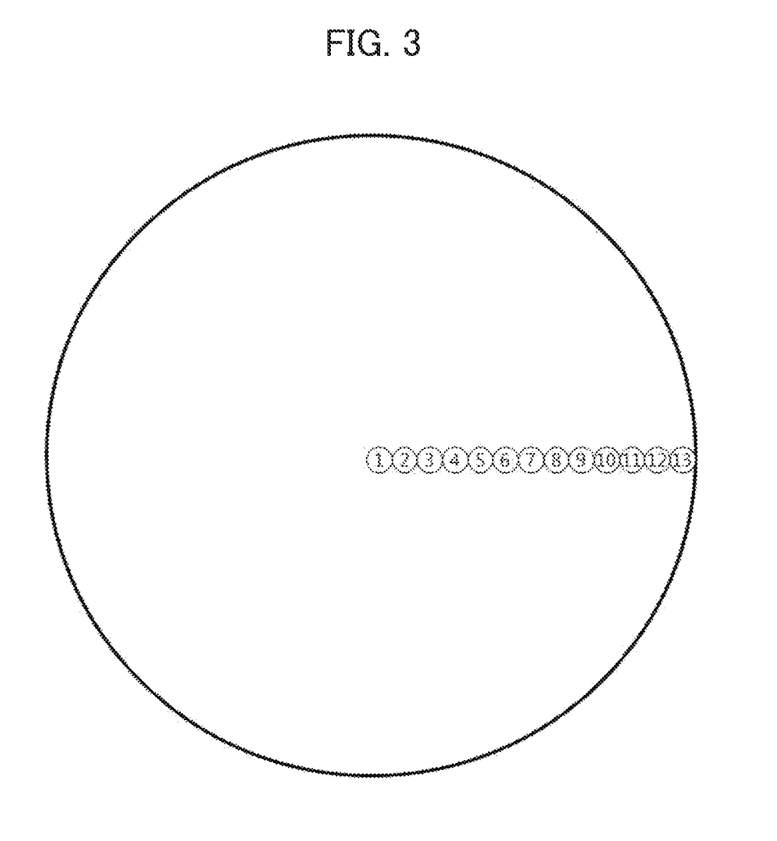
FIG. 3 is a schematic cross-sectional view illustrating positions at which a concentration gradient of a cathode active material particle prepared in accordance with some example embodiments is measured.

FIG. 3 is a schematic cross-sectional view illustrating positions at which a concentration gradient of a cathode active material particle prepared in accordance with some example embodiments is measured. Referring to FIG. 3, in the lithium metal oxide particle having a distance of 4.8 μm from a centerto a surface, a molar ratio of each meal. Included in the lithium metal oxide particle was measured at positions nrEmbered from 1 to 12 per a distance of 0.4 μm from the center. The molar ratio of each metal was measured per a distance 0.04 μm at positions membered from 12 to 13 (from 12-1 to and 12-9). The results are shown in Table 2 below

TABLE 2

| Position Number | Molar Ratio of Ni | Molar Ratio of Co | Molar Ratio of Mn |
|---|---|---|---|
| 1 | 0.802 | 0.110 | 0.088 |
| 2 | 0.801 | 0.111 | 0.088 |
| 3 | 0.802 | 0.110 | 0.088 |
| 4 | 0.802 | 0.110 | 0.088 |
| 5 | 0.803 | 0.111 | 0.086 |
| 6 | 0.802 | 0.110 | 0.088 |
| 7 | 0.802 | 0.110 | 0.088 |
| 8 | 0.802 | 0.109 | 0.089 |
| 9 | 0.801 | 0.110 | 0.089 |
| 10 | 0.802 | 0.110 | 0.088 |
| 11 | 0.802 | 0.108 | 0.090 |
| 12 | 0.800 | 0.110 | 0.090 |
| 12-1 | 0.794 | 0.110 | 0.096 |
| 12-2 | 0.789 | 0.109 | 0.102 |
| 12-3 | 0.782 | 0.110 | 0.108 |
| 12-4 | 0.777 | 0.110 | 0.113 |
| 12-5 | 0.770 | 0.110 | 0.120 |
| 12-6 | 0.771 | 0.110 | 0.119 |
| 12-7 | 0.770 | 0.110 | 0.120 |
| 12-8 | 0.769 | 0.111 | 0.120 |
| 12-9 | 0.770 | 0.109 | 0.121 |
| 13 | 0.770 | 0.110 | 0.120 |

EXPERIMENTAL EXAMPLE (1) Evaluation of Formation Discharge Capacity/Discharge: Efficiency Coin half cells in Examples and Comparative Examples were charged (0.1 C, 4.3 V) with a reversible capacity of 190 mAl/g, and formation discharge capacity and efficiency were measured when the coin half cells were discharged (0.1 C, 3 V).

(2) Evaluation of Power Output

Power outputs of the coin half cells in Examples and Comparative Examples were measured by (15 C charging and 4 C discharging, and ratios of 4 C discharge capacity relative to 0.1 C discharge capacity were calculated.

(3) Evaluation of Power Output at Room Temperature, of Lithium Secondary Battery Power outputs at room temperature of lithium secondary batteries in Examples and Comparative Examples were measured by a HPPC(Hybrid Pulse Power Characterization by FreedomCar Battery Test Manual) method.

The results were shown in Table 3 below.

TABLE 3

| | Formation Discharge Capacity (mAh/g) | Formation Discharge Efficiency (%) | Ratio of 4 C discharge capacity relative to 0.1 C capacity (%) | Power Output at room temperature (W/kg) |
|---|---|---|---|---|
| Example 1 | 198.4 | 92.5 | 83.7 | 3100 |
| Example 2 | 198.7 | 91.8 | 82.5 | 3066 |
| Example 3 | 198.9 | 91.5 | 82.0 | 3035 |
| Example 4 | 207.7 | 92.6 | 86.0 | 3115 |
| Example 5 | 207.3 | 92.4 | 84.9 | 3085 |
| Example 6 | 205.7 | 91.6 | 84.4 | 3055 |
| Example 7 | 214.5 | 92.8 | 85.2 | 3115 |
| Example 8 | 213.2 | 92.3 | 84.9 | 3108 |
| Example 9 | 211.7 | 91.6 | 84.8 | 3099 |
| Example 10 | 198.5 | 92.3 | 82.5 | 3071 |
| Comparative Example 1 | 191.4 | 85.9 | 74.7 | 2692 |
| Comparative Example 2 | 193.1 | 87.1 | 76.0 | 2775 |
| Comparative Example 3 | 197.6 | 87.9 | 77.7 | 2795 |
| Comparative Example 4 | 195.4 | 87.3 | 75.4 | 2717 |
| Comparative Example 5 | 191.6 | 86.0 | 73.5 | 2650 |
| Comparative Example 6 | 190.7 | 85.6 | 72.1 | 2584 |
| Comparative Example 7 | 203.8 | 88.1 | 76.8 | 2700 |
| Comparative Example 8 | 204.1 | 88.4 | 79.6 | 2799 |
| Comparative Example 9 | 204.7 | 87.9 | 79.6 | 2800 |
| Comparative Example 10 | 201.7 | 87.3 | 78.2 | 2735 |
| Comparative Example 11 | 198.5 | 86.0 | 75.0 | 2640 |
| Comparative Example 12 | 196.5 | 84.9 | 73.2 | 2575 |
| Comparative Example 13 | 209.2 | 87.5 | 79.9 | 2840 |
| Comparative Example 14 | 206.7 | 86.4 | 78.3 | 2775 |
| Comparative Example 15 | 204.6 | 85.6 | 76.4 | 2700 |
| Comparative Example 16 | 202.6 | 84.8 | 75.0 | 2650 |

As shown in Table 3, the coin half cells or lithium secondary batteries of Examples showed the formation discharge eapacityldischarge efficiency and power output greater than those in Comparative Examples.

What is claimed is:

1. A cathode active material for a lithium secondary battery, comprising:
a lithium metal oxide particle having a form of secondary particle in which a plurality of primary particles are aggregated,
wherein the primary particles include a particle having a rod-type shape, and
wherein the lithium metal oxide particle is represented by Chemical Formula 1;

$$Li_xM1_aM2_bM3_cO_y \quad \text{[Chemical Formula 1]}$$

wherein in Chemical Formula, M1, M2 and M3 represents a first metal, a second metal and a third metal, respectively, and the first metal is Ni, the second metal is Mn and the third metal is Co,
$0<x\leq1.1$, $2\leq y\leq2.02$, $0.8\leq a\leq0.9$, $0.01\leq b\leq0.2$, $0.04\leq c\leq0.2$, $0.091\leq c/(a+c)\leq0.111$, and $a+b+c=1$,
wherein the first metal includes a decreasing concentration gradient region only at a specific portion between a central portion of the lithium metal oxide particle and a surface of the lithium metal oxide particle, and the third metal has a constant concentration from the central portion of the lithium metal oxide particle to the surface of the lithium metal oxide particle,
wherein a molar ratio of the first metal at the surface is 0.770 or more based on a total amount of the first metal, the second metal and the third metal,
wherein the first metal and the second metal do not have a continuous concentration gradient in a region of 0.4 μm radius from a center of the lithium metal oxide particle.

2. The cathode active material for a lithium secondary battery according to claim 1, wherein the second metal includes a concentration gradient region at a specific portion between the central portion of the lithium metal oxide particle and the surface of the lithium metal oxide particle.

3. The cathode active material for a lithium secondary battery according to claim 2, wherein
the second metal includes an increasing concentration gradient region between the central portion of the lithium metal oxide particle and the surface of the lithium metal oxide particle.

4. The cathode active material for a lithium secondary battery according to claim 1, wherein an average diameter (D50) of the lithium metal oxide particle is in a range from 3 μm to 25 μm.

5. The cathode active material for a lithium secondary battery according to claim 1, wherein the lithium metal oxide particle includes a dopant or a coating containing at least one element selected from a group consisting of Al, Ti, Ba, Zr, Si, B, Mg and P.

6. The cathode active material for a lithium secondary battery according to claim 1, wherein a long-axis of the particle having a rod-type shape is oriented in a direction from a central portion of the lithium metal oxide particle to a surface of the lithium metal oxide particle.

* * * * *